(12) United States Patent
Hutten et al.

(10) Patent No.: US 11,475,637 B2
(45) Date of Patent: Oct. 18, 2022

(54) MULTI-INSTANCE MULTI-USER AUGMENTED REALITY ENVIRONMENT

(71) Applicant: Wormhole Labs, Inc., Huntington Beach, CA (US)

(72) Inventors: Curtis Hutten, Laguna Beach, CA (US); Robert D. Fish, Irvine, CA (US)

(73) Assignee: Wormhole Labs, Inc., Sherman Oaks, CA (US)

( * ) Notice: Subject to any disclaimer, the term of this patent is extended or adjusted under 35 U.S.C. 154(b) by 0 days.

(21) Appl. No.: 16/658,984

(22) Filed: Oct. 21, 2019

(65) Prior Publication Data
US 2021/0118231 A1      Apr. 22, 2021

(51) Int. Cl.
*G06T 19/00* (2011.01)
*G06T 13/40* (2011.01)

(52) U.S. Cl.
CPC ............ *G06T 19/006* (2013.01); *G06T 13/40* (2013.01); *G06T 2219/024* (2013.01)

(58) Field of Classification Search
CPC .. G06T 19/006; G06T 13/40; G06T 2219/024
See application file for complete search history.

(56) References Cited

U.S. PATENT DOCUMENTS

| 7,016,532 | B2 | 3/2006 | Boncyk et al. |
| 7,477,780 | B2 | 1/2009 | Boncyk et al. |
| 7,565,008 | B2 | 1/2009 | Boncyk et al. |
| 7,680,324 | B2 | 3/2010 | Boncyk et al. |
| 8,633,946 | B2 | 1/2014 | Cohen |
| 8,817,045 | B2 | 8/2014 | Cohen |
| 2009/0165140 | A1 | 6/2009 | Robinson |
| 2009/0300535 | A1* | 12/2009 | Skourup ............... G06F 3/011 715/773 |

(Continued)

FOREIGN PATENT DOCUMENTS

| KR | 1020130009829 | 1/2013 |
| WO | 2018083668 A1 | 5/2018 |

OTHER PUBLICATIONS

Heun, Valentin, Smarter objects: using AR technology to program physical objects and their interactions "Extended Abstracts on Human Factors in Computing Systems", Apr. 2013, pp. 961-966. (Year: 2013).*

(Continued)

*Primary Examiner* — Terrell M Robinson
(74) *Attorney, Agent, or Firm* — Fish IP Law, LLP (57) ABSTRACT

A system that allows users of augmented reality environments to interact with each other across instances. For each user, the system recognizes real-world objects in an image of a real-world environment and retrieves augmented reality assets to overlay according to each user's selected theme. A user can open a multi-dimensional region in which the augmented reality assets of their augmented reality environment are replaced with those of a different augmented reality environment, giving the user a way to tunnel into another user's augmented reality environment. The augmented reality assets may include commands linked to real-world objects capable of receiving commands, allowing for users to interact with the real-world objects in the environment, such as a streamer's environment.

8 Claims, 8 Drawing Sheets

(56) References Cited

U.S. PATENT DOCUMENTS

| | | | | |
|---|---|---|---|---|
| 2010/0177035 | A1* | 7/2010 | Schowengerdt | G06F 3/011 |
| | | | | 345/156 |
| 2012/0327119 | A1 | 12/2012 | Woo | |
| 2013/0265300 | A1* | 10/2013 | Vardi | G06F 3/014 |
| | | | | 345/419 |
| 2014/0025481 | A1 | 1/2014 | Kang | |
| 2014/0071127 | A1* | 3/2014 | Shuster | A63F 13/30 |
| | | | | 345/420 |
| 2015/0193982 | A1 | 7/2015 | Mihelich et al. | |
| 2015/0356781 | A1* | 12/2015 | Miller | G06F 3/017 |
| | | | | 345/633 |
| 2016/0100034 | A1* | 4/2016 | Miller | G06F 3/017 |
| | | | | 709/205 |
| 2016/0217615 | A1* | 7/2016 | Kraver | G09G 5/003 |
| 2016/0343160 | A1* | 11/2016 | Blattner | G06T 13/40 |
| 2017/0076499 | A1* | 3/2017 | Jiang | G06T 7/00 |
| 2017/0301140 | A1* | 10/2017 | Smith | G06T 1/20 |

OTHER PUBLICATIONS

Nvidia AI turns crude doodles into photorealistic landscapes, https://www.engadget.com/2019/03/20/nvidia-ai-doodles-photorealistic/, Apr. 4, 2019, 11 pages.

International search report dated Feb. 15, 2021, for related PCT application No. PCT/US2020/056623. 9 pages.

* cited by examiner

MULTI-INSTANCE MULTI-USER AUGMENTED REALITY ENVIRONMENT

FIELD OF THE INVENTION

The field of the invention is multi-user augmented reality environments.

BACKGROUND

The background description includes information that may be useful in understanding the present invention. It is not an admission that any of the information provided herein is prior art or relevant to the presently claimed invention, or that any publication specifically or implicitly referenced is prior art.

Augmented reality allows users to interact with virtual elements as if they were a part of the real world. Many augmented reality applications are single-user experiences. Some applications, such as games, can involve multiple players. However, in order to interact, the users are required to be in the same instance of the game at all times. This also requires that the experience for all users be uniform—the instance must appear according to a single theme for all players.

As "streamers" continue to grow in popularity, they look for ways to grow their fan communities. For these communities of fans that support streamers, there is no way for the viewing public to interact with the streamer or with each other outside of a chat window.

Thus, there is still a need for augmented reality systems that provide an engaging experience in single-user environments that also enable an interaction between users across established instances.

SUMMARY OF THE INVENTION

The inventive subject matter provides apparatus, systems and methods in which a user experiencing a first augmented reality environment can view and tunnel into a second user's augmented reality environment.

In embodiments of the inventive subject matter, the system includes a computer programmed to receive an image of a physical space captured by a camera. The computer recognizes one or more real-world objects within the physical space based on their depictions in the image and retrieves corresponding first augmented reality asset(s) to overlay over the recognized real-world object(s) to create a first augmented reality environment.

The first augmented reality assets belong to a first set of augmented reality assets that are grouped according to a first theme.

The system then displays the first augmented reality environment (the image of the physical space with the overlaid first augmented reality asset(s)) to the user.

Upon receiving a selection of a multi-dimensional region within the image that includes one or more of the recognized real-world objects, the computer is programmed to retrieve and overlay a second augmented reality asset from a second set of augmented reality assets grouped according to a second theme over the real-world object within the multi-dimensional region, as a part of a second augmented reality environment. To this first user, second augmented reality environment would be the section of the visible image within the multi-dimensional region that has second augmented reality asset(s) instead of the first augmented reality asset(s). Thus, any augmented reality assets from the first set that were applied over real-world objects outside of the multi-dimensional region would remain unchanged.

The first user can interact with the multi-dimensional region, including resizing it to encompass a greater or smaller part of the screen. A user can tunnel or "wormhole" into the second augmented reality environment by interacting with the multi-dimensional region such that it encompasses the entire image (i.e., the entire screen of the first user's device), effectively replacing all of the first augmented reality assets with corresponding second augmented reality assets, thus leaving the first augmented reality environment and entering completely into the second augmented reality environment. Each user will have their own augmented reality environment, and as such a user tunneling or wormholing into a different augmented reality environment will be entering another user's augmented reality environment and will be able to interact with it accordingly.

The augmented reality assets are grouped in sets according to themes, which are applied to give the augmented reality environment a particular theme.

In order to add a layer of engagement to a streamer's feed, users could interact with a streamer's environment to "mess" with the streamer. To do so, one or more of the augmented reality assets has commands associated with and linked to real-world objects within the streamer's environment such that interacting with the augmented reality asset issues a command for a function of the associated/linked real-world object. Thus, users can cause things to happen in the streamer's environment and see it happen during the streamer's stream of content.

In embodiments, the system can recognize the presence of a person within the real-world environment and adjust the presentation of the augmented reality assets based on the presence of the person.

In embodiments, the system can include a three-dimensional model of the real-world environment that can be used so that an avatar of the user can appear to navigate the real-world environment as a part of the augmented reality environment.

Various objects, features, aspects and advantages of the inventive subject matter will become more apparent from the following detailed description of preferred embodiments, along with the accompanying drawing figures in which like numerals represent like components.

All publications identified herein are incorporated by reference to the same extent as if each individual publication or patent application were specifically and individually indicated to be incorporated by reference. Where a definition or use of a term in an incorporated reference is inconsistent or contrary to the definition of that term provided herein, the definition of that term provided herein applies and the definition of that term in the reference does not apply.

The following description includes information that may be useful in understanding the present invention. It is not an admission that any of the information provided herein is prior art or relevant to the presently claimed invention, or that any publication specifically or implicitly referenced is prior art.

In some embodiments, the numbers expressing quantities of ingredients, properties such as concentration, reaction conditions, and so forth, used to describe and claim certain embodiments of the invention are to be understood as being modified in some instances by the term "about." Accordingly, in some embodiments, the numerical parameters set forth in the written description and attached claims are approximations that can vary depending upon the desired properties sought to be obtained by a particular embodiment.

In some embodiments, the numerical parameters should be construed in light of the number of reported significant digits and by applying ordinary rounding techniques. Notwithstanding that the numerical ranges and parameters setting forth the broad scope of some embodiments of the invention are approximations, the numerical values set forth in the specific examples are reported as precisely as practicable. The numerical values presented in some embodiments of the invention may contain certain errors necessarily resulting from the standard deviation found in their respective testing measurements.

Unless the context dictates the contrary, all ranges set forth herein should be interpreted as being inclusive of their endpoints and open-ended ranges should be interpreted to include only commercially practical values. Similarly, all lists of values should be considered as inclusive of intermediate values unless the context indicates the contrary.

As used in the description herein and throughout the claims that follow, the meaning of "a," "an," and "the" includes plural reference unless the context clearly dictates otherwise. Also, as used in the description herein, the meaning of "in" includes "in" and "on" unless the context clearly dictates otherwise.

The recitation of ranges of values herein is merely intended to serve as a shorthand method of referring individually to each separate value falling within the range. Unless otherwise indicated herein, each individual value is incorporated into the specification as if it were individually recited herein. All methods described herein can be performed in any suitable order unless otherwise indicated herein or otherwise clearly contradicted by context. The use of any and all examples, or exemplary language (e.g. "such as") provided with respect to certain embodiments herein is intended merely to better illuminate the invention and does not pose a limitation on the scope of the invention otherwise claimed. No language in the specification should be construed as indicating any non-claimed element essential to the practice of the invention.

Groupings of alternative elements or embodiments of the invention disclosed herein are not to be construed as limitations. Each group member can be referred to and claimed individually or in any combination with other members of the group or other elements found herein. One or more members of a group can be included in, or deleted from, a group for reasons of convenience and/or patentability. When any such inclusion or deletion occurs, the specification is herein deemed to contain the group as modified thus fulfilling the written description of all Markush groups used in the appended claims.

DETAILED DESCRIPTION

Throughout the following discussion, numerous references will be made regarding servers, services, interfaces, engines, modules, clients, peers, portals, platforms, or other systems formed from computing devices. It should be appreciated that the use of such terms, is deemed to represent one or more computing devices having at least one processor (e.g., ASIC, FPGA, DSP, x86, ARM, ColdFire, GPU, multi-core processors, etc.) programmed to execute software instructions stored on a computer readable tangible, non-transitory medium (e.g., hard drive, solid state drive, RAM, flash, ROM, etc.). For example, a server can include one or more computers operating as a web server, database server, or other type of computer server in a manner to fulfill described roles, responsibilities, or functions. One should further appreciate the disclosed computer-based algorithms, processes, methods, or other types of instruction sets can be embodied as a computer program product comprising a non-transitory, tangible computer readable media storing the instructions that cause a processor to execute the disclosed steps. The various servers, systems, databases, or interfaces can exchange data using standardized protocols or algorithms, possibly based on HTTP, HTTPS, AES, public-private key exchanges, web service APIs, known financial transaction protocols, or other electronic information exchanging methods. Data exchanges can be conducted over a packet-switched network, the Internet, LAN, WAN, VPN, or other type of packet switched network.

The following discussion provides many example embodiments of the inventive subject matter. Although each embodiment represents a single combination of inventive elements, the inventive subject matter is considered to include all possible combinations of the disclosed elements. Thus, if one embodiment comprises elements A, B, and C, and a second embodiment comprises elements B and D, then the inventive subject matter is also considered to include other remaining combinations of A, B, C, or D, even if not explicitly disclosed.

As used herein, and unless the context dictates otherwise, the term "coupled to" is intended to include both direct coupling (in which two elements that are coupled to each other contact each other) and indirect coupling (in which at least one additional element is located between the two elements). Therefore, the terms "coupled to" and "coupled with" are used synonymously.

Figure 1:
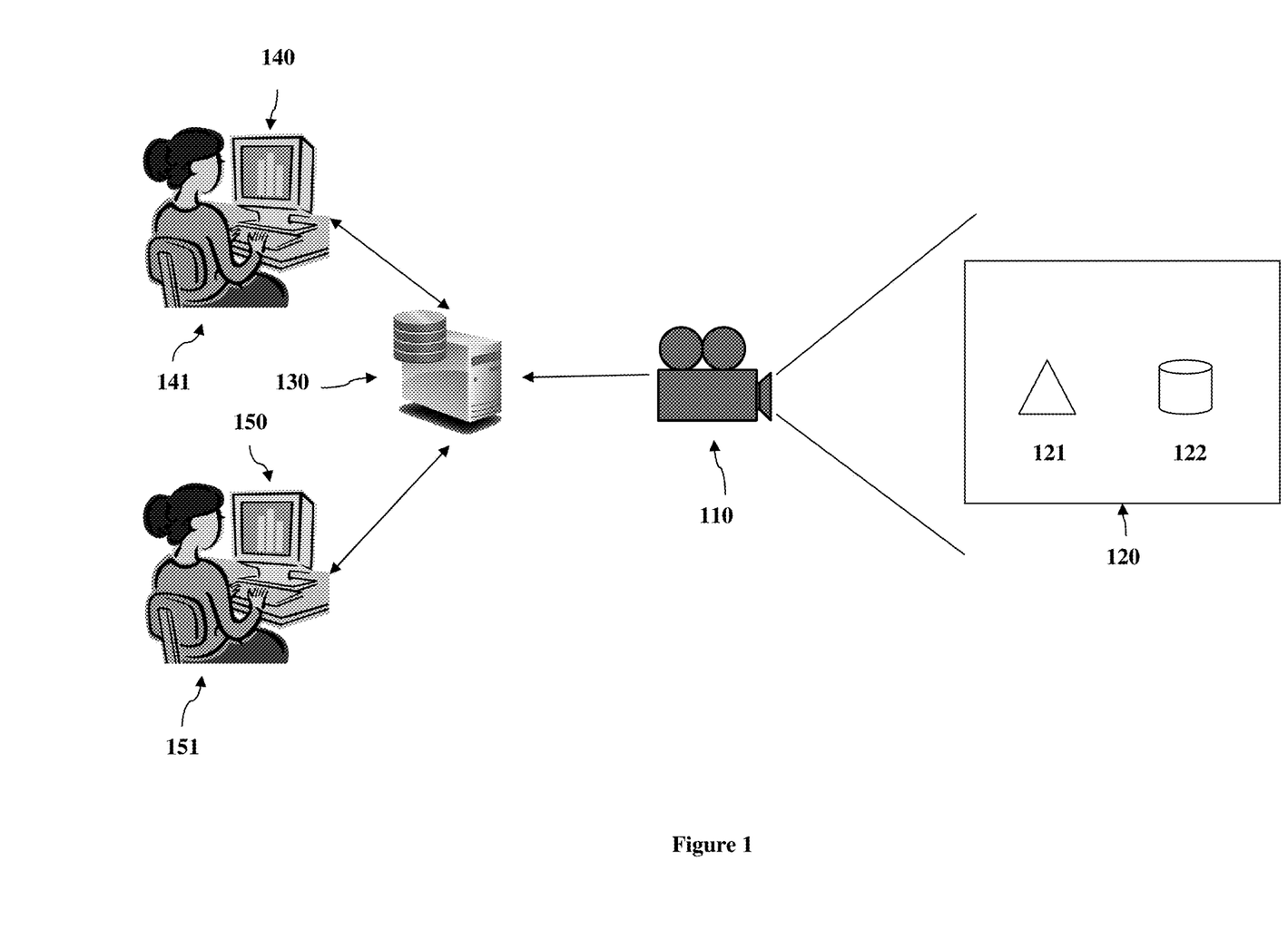
FIG. 1 is a diagrammatic view of a system according to embodiments of the inventive subject matter.

FIG. 1 provides a diagrammatic overview of a system 100 according to embodiments of the inventive subject matter. The system of FIG. 1 includes a camera 110 configured to capture image data of real-world scene 120. The camera 110 is communicatively coupled with a server computer 130. The system 100 includes computing devices 140, 150 communicatively coupled with server computer 130.

As shown in FIG. 1, camera 110 captures image data of a real-world scene 120. The real-world scene 120 contains real-world objects 121, 122. The image data captured by the camera 110 is transmitted to the server 130, which analyzes it using image recognition techniques to recognize the real-world objects 121, 122 within the real-world scene depicted in the image data.

The image can be a still image, but in preferred embodiments is a video image. It is contemplated that the video image can be streamed video, broadcast "live."

In the embodiments illustrated herein, the functions associated with the inventive subject matter are performed by the server 130. However, in other embodiments, some or all of the functions can be performed by the client devices 140, 150.

Computing devices 140, 150 are illustrated in FIG. 1 as desktop computers. However, it is contemplated that computing devices 140, 150 can include any type of computing devices that allow user input and have a display. Examples of suitable computer devices include desktop computers, laptop computers, tablets, phablets, smartphones, video game consoles, etc.

Server 130 can be one computing device or a plurality of computing devices communicatively coupled to carry out the various functions of the inventive subject matter. It is contemplated that, in embodiments, server 130 can be the same computing device as one of the computing devices 140, 150. In other embodiments, the server 130 and camera 110 can be integral to the same device.

Data exchanges between one or more of the camera 110, server 130 and computing devices 140, 150 can be performed according to any available data exchange communication interface, including wired or wireless connections. Examples include Wi-Fi, cellular, NFC, Bluetooth, USB, HDMI, etc.

In embodiments, multiple cameras 120 can be taking images of the same real-world environment. This would provide multiple angles for the augmented reality environments, the assets, and the interactions associated with each.

Figure 2:
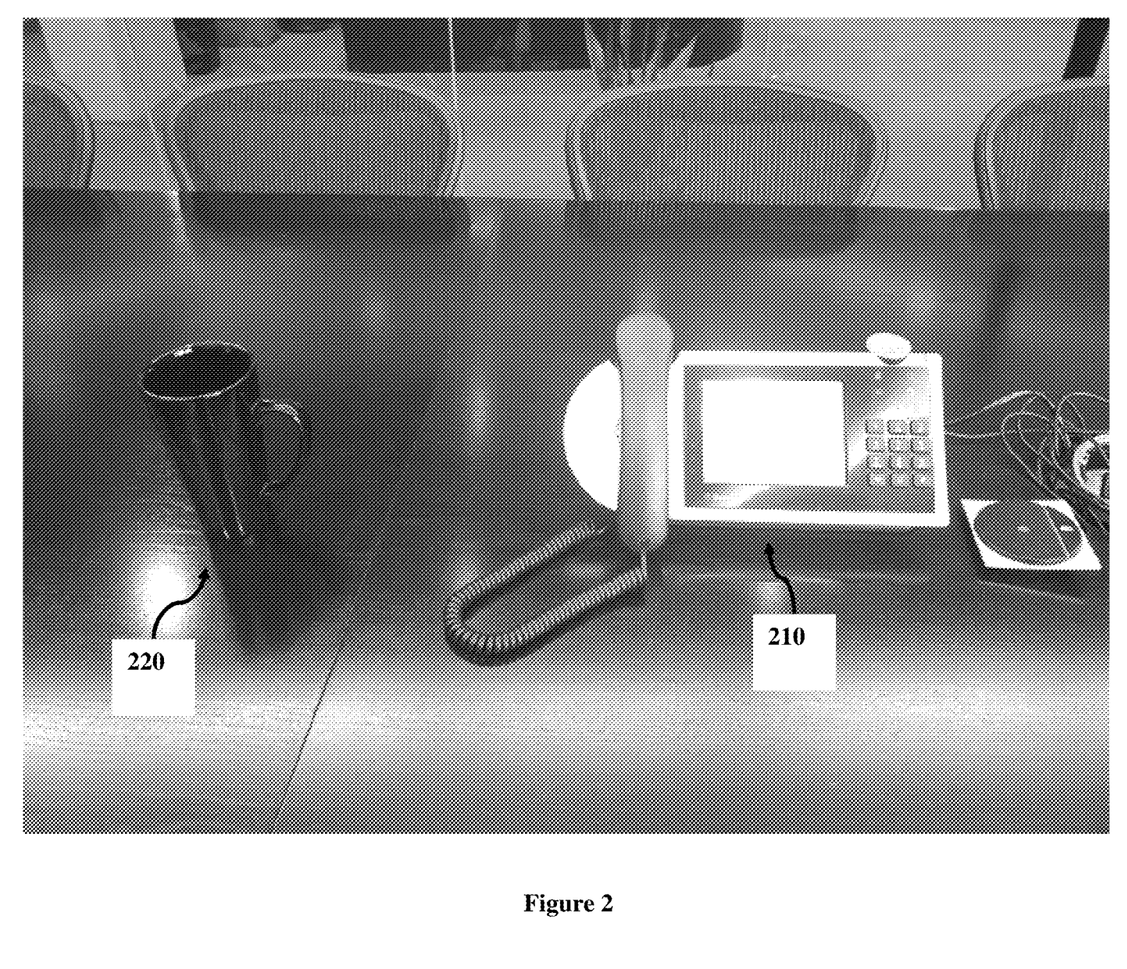
FIG. 2 is a depiction of a real-world scene captured by a camera.

FIG. 2 provides an image of a real-world scene captured by a camera, such as camera 110. Within the scene of FIG. 2, there are real-world objects 210 (the telephone) and 220 (the coffee mug) that are recognized by the server 130 as real-world objects associated with the system augmented reality applications.

For each user, the server 130 retrieves augmented reality assets corresponding to each of the identified real-world objects according to a theme for the particular user. The theme is typically user-selected, but can be assigned by the server 130 at random or selected via other methods.

Examples of contemplated themes include an office theme, a vacation theme, a sports theme, a fantasy theme, a science-fiction theme, a western theme, an old-time theme, a futuristic theme, an action theme, an adventure theme, a noir theme, and a medieval theme.

In embodiments, the server 130 stores augmented reality assets in a database grouped according to a particular theme. The appearance and functions of the augmented reality assets correspond to their respective themes.

The augmented reality assets can include graphical models of an object according to a theme. The models are preferably three-dimensional models of objects such that they can be inserted into a digital depiction of a real-world scene and appear to have volume within that scene, as well as being inserted into a scene in a correct perspective and potentially being viewable from different perspectives. The graphical models are preferably computer models that can have motion and/or animation such that the augmented reality asset is not a static image within the scene but rather can be animated and interacted with.

For example, in an office theme one of the augmented reality assets could be a telephone asset. The asset would include a graphical model of the telephone that would be overlaid over the real-world depiction of a telephone within a scene.

Each augmented reality assets in the database also include one or more identifiers that identifies a real-world object to which the augmented reality asset corresponds such that when a particular real-world object in a scene is recognized by the system, the server 130 can identify the augmented reality asset based on the identifier and retrieve it for display.

Continuing with the example of an office theme, the telephone asset also includes an identifier of "telephone" (and other similar words such as "phone") in the database such that when the system recognizes a real-world telephone within an image of a real-world scene, the server 130 can retrieve the telephone augmented reality asset.

In embodiments, one or more of the augmented reality assets also include computer-executable instructions that execute functions associated with the augmented reality asset within the augmented reality environment. These functions can be interactive functions that cause the execution of an effect within the augmented reality environment when the user interacts with the augmented reality asset.

In the example of the telephone augmented reality asset, contemplated functions can include sounds associated with the telephone ringing, lights of the phone lighting up, etc. Likewise, contemplated interactive functions can include the ability for a user to dial the telephone's number pad, virtually pick up the receiver to answer a call, speak through the telephone (via a microphone of the user's computing device), etc.

Other methods of retrieving and presenting augmented reality assets in augmented reality environments are known in the art, and are suitable for use with the systems and methods of the inventive subject matter.

Figure 3:
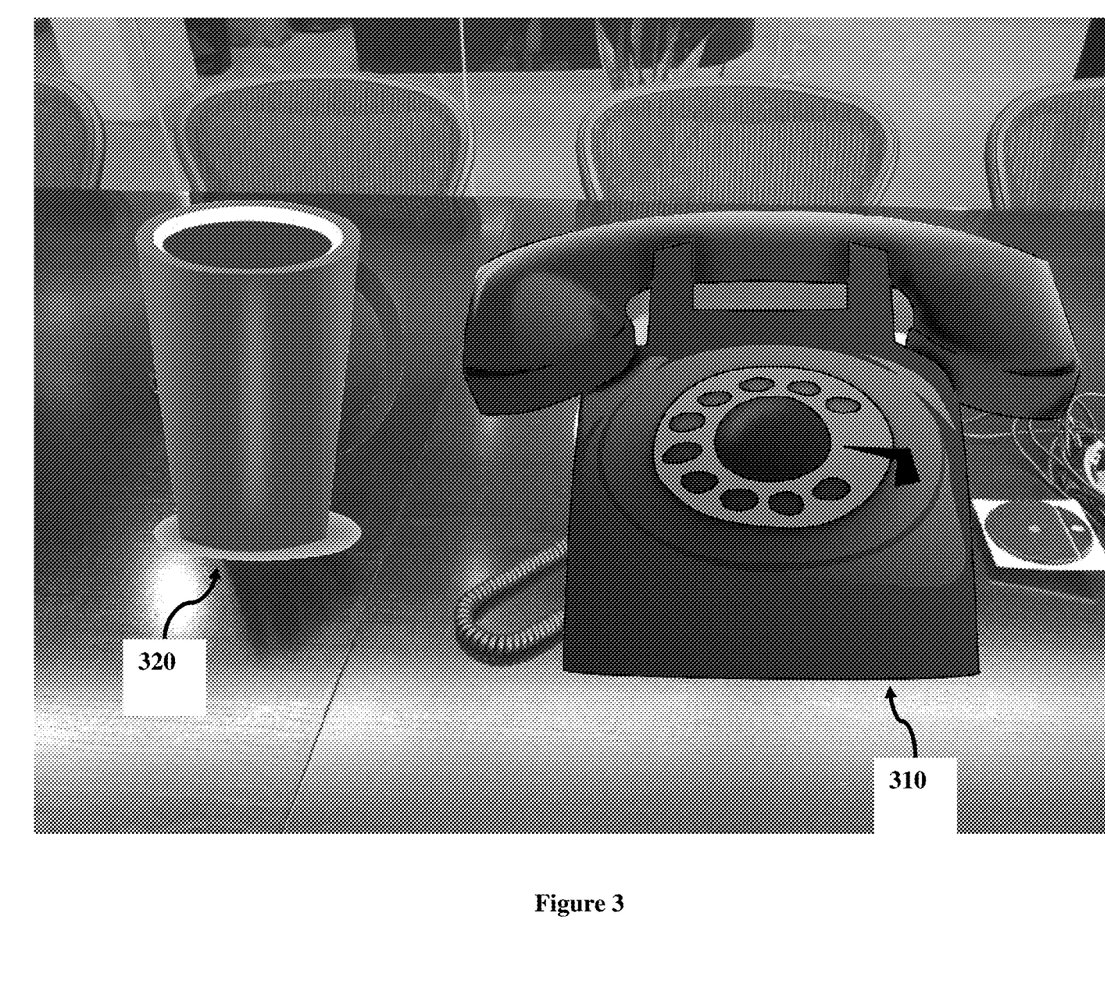
FIG. 3 provides an illustrative example of a first augmented reality environment generated for a first user, according to embodiments of the inventive subject matter.

FIG. 3 shows an example illustration of a first augmented reality environment generated by the server 130 for a first user 141, presented via computing device 140. In this augmented reality environment, augmented reality assets 310, 320 have been selected according to a first theme (for example, an office theme) and overlaid by server 130 over the real-world objects 210, 220 seen in FIG. 2.

Figure 4:
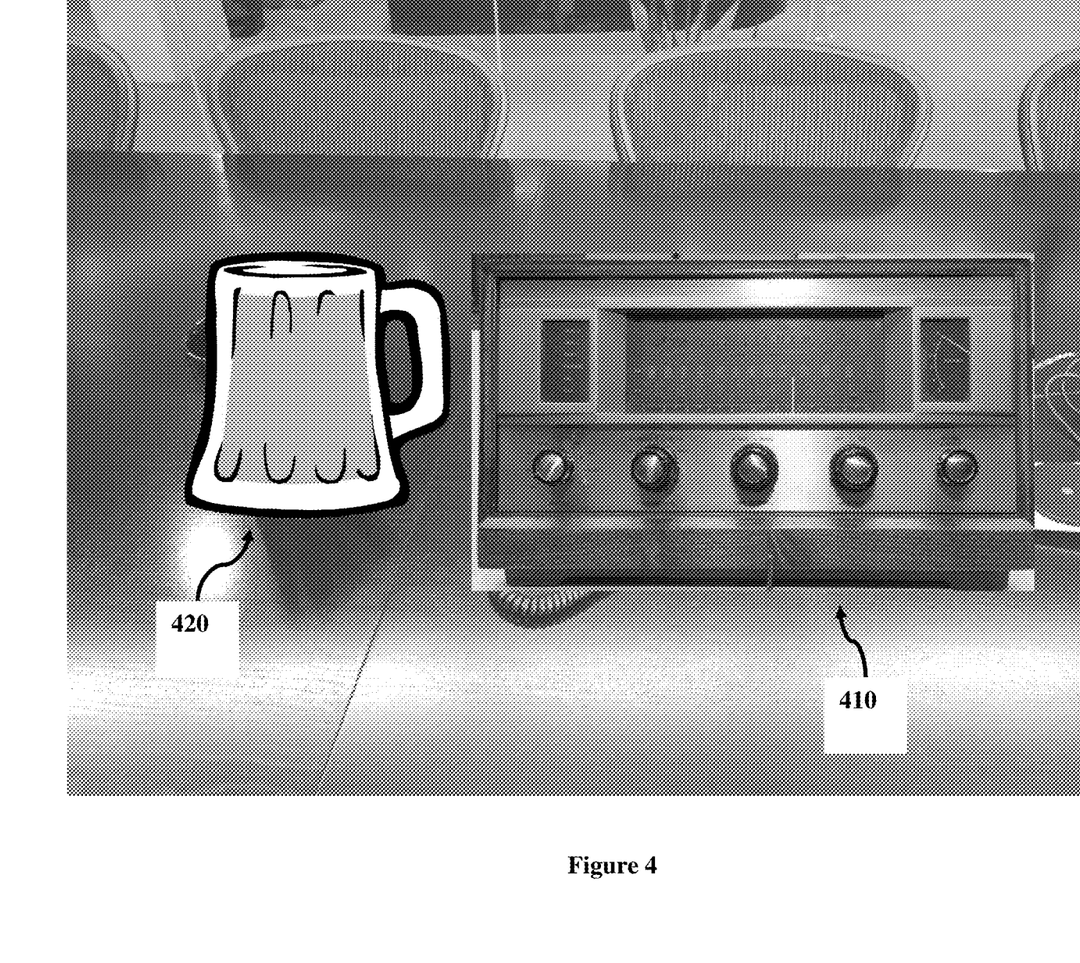
FIG. 4 provides an illustrative example of a second augmented reality environment generated for a second user, according to embodiments of the inventive subject matter.

It should be noted that the augmented reality assets used in themes do not necessarily have to be literal augmented reality representations of the real-world objects over which they are overlaid. FIG. 4 shows an example illustration of a second augmented reality environment, generated by server 130 for a second user 151, presented via computing device 150. In the second augmented reality environment, augmented reality assets 410 (the radio) and 420 (the beer mug) have been selected according to a second theme (for example, a relaxation theme) and overlaid by server 130 over the real-world objects 210, 220, respectively.

As the data used for the first and second augmented reality environments comes from the same camera 110, the first and second augmented reality environments of FIGS. 3 and 4 are generated from the same real-world scene.

The systems and methods of the inventive subject matter allow a user to "wormhole" or "tunnel" into a different user's augmented reality environment. For example, suppose that user 141 wishes to wormhole into user 151's augmented reality environment. User 141 might select user 151 from a list of users viewing the same real-world scene, or the server 130 might select user 151 at random from all users viewing the same real-world scene once user 141 has issued a request to wormhole into another user's augmented reality environment.

Figure 5:
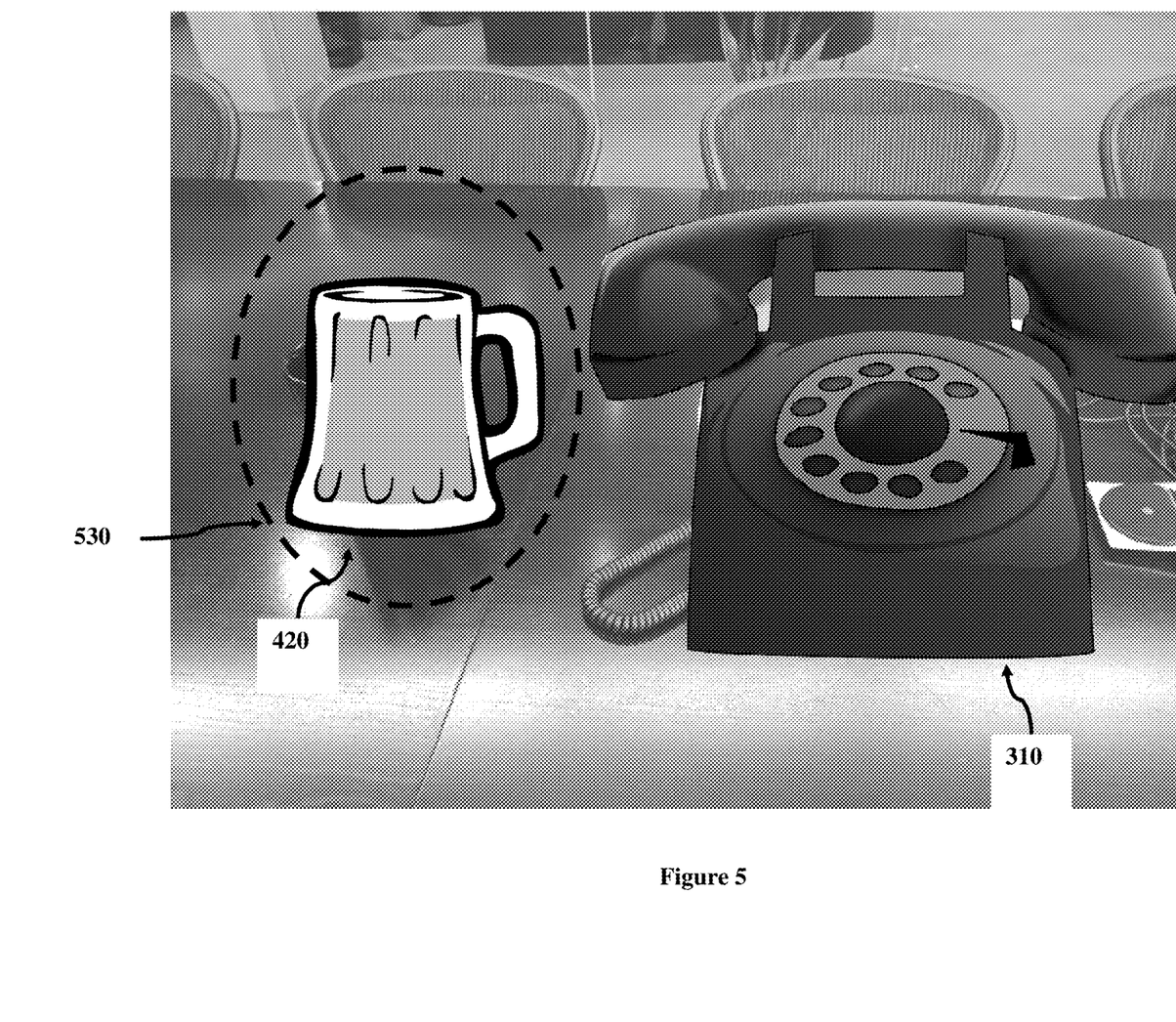
FIG. 5 provides an illustrative example of the first augmented reality environment with a generated multi-dimensional region.

As illustrated in FIG. 5, the server 130 generates a multi-dimensional region 530 based on a user's selection of a location on their screen. For any recognized real-world objects within the multi-dimensional region 530, the server 130 replaces the augmented reality asset of the selecting user with an augmented reality asset corresponding to the user whose augmented reality environment the selecting user is "wormholing" into. Thus, in the illustrative example of FIG. 5, the augmented reality asset 320 (the overlaid coffee mug) of the first augmented reality environment is replaced with the second augmented reality asset 420 (the overlaid beer mug) of the second augmented reality environment. To do so, the server 130 can retrieve the second augmented reality asset 420 and apply it by looking up the second augmented reality asset without having to create a new instance. This can be performed, for instance, by the server 130 first locating the collected assets of the second theme within the database (such as in a folder or other storage location storing the augmented reality assets of the second theme) and then looking for the corresponding second augmented reality asset 420 by using the identifier of the asset within that theme.

Figure 6:
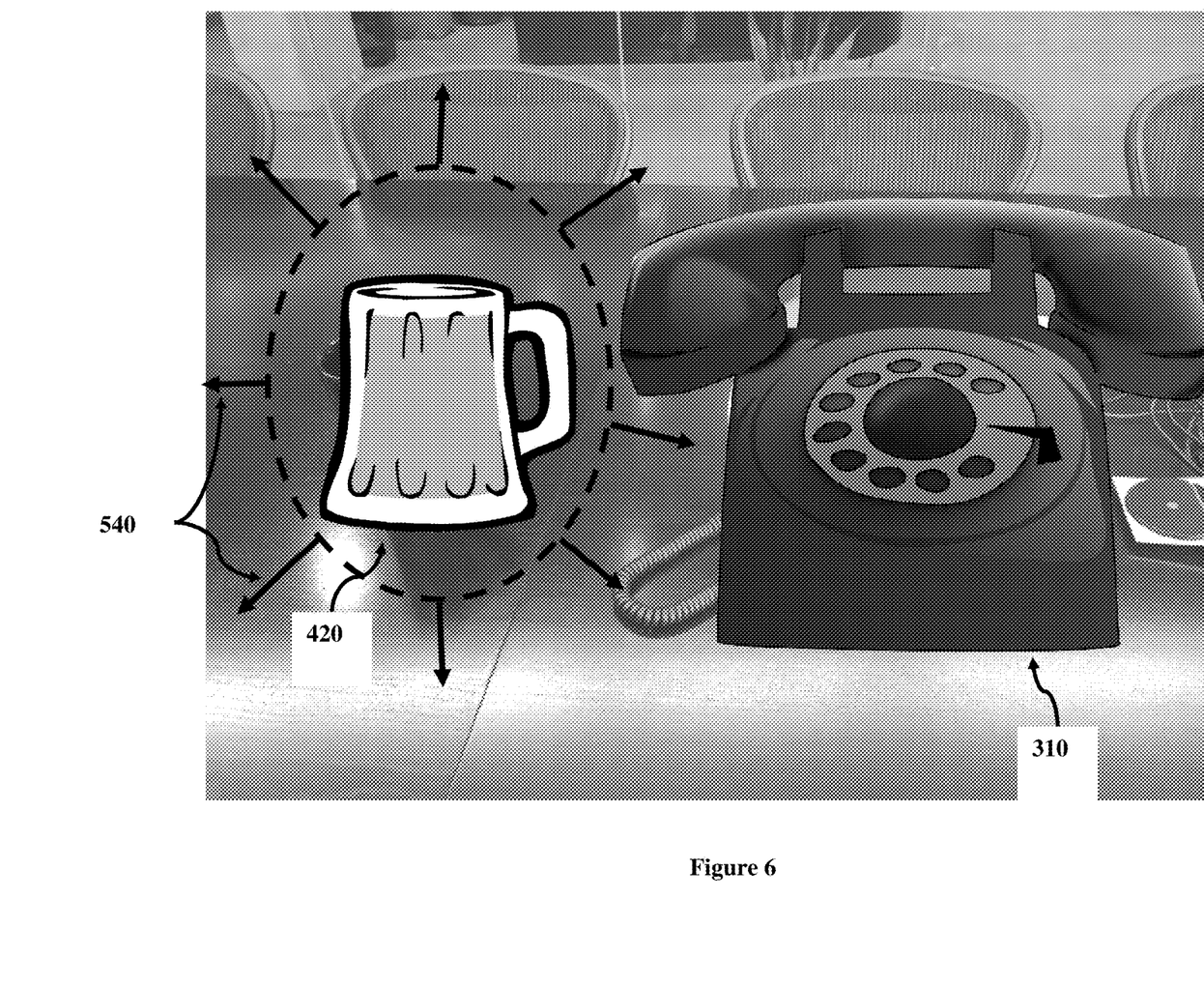
FIG. 6 illustrates the multi-dimensional region of FIG. 5, being expanded.

The multi-dimensional region 530 can be expanded by the user 141 by dragging the edges outward or otherwise re-sizing it to cover more of the screen, represented by the outward arrows 540 shown in FIG. 6. As the multi-dimensional region 530 expands, any additional real-world objects recognized by the server 130 as coming within the multi-dimensional region 530 will have corresponding first augmented reality assets (according to the first augmented reality environment) replaced with corresponding second augmented reality assets (according to the second augmented reality environment).

Figure 7:
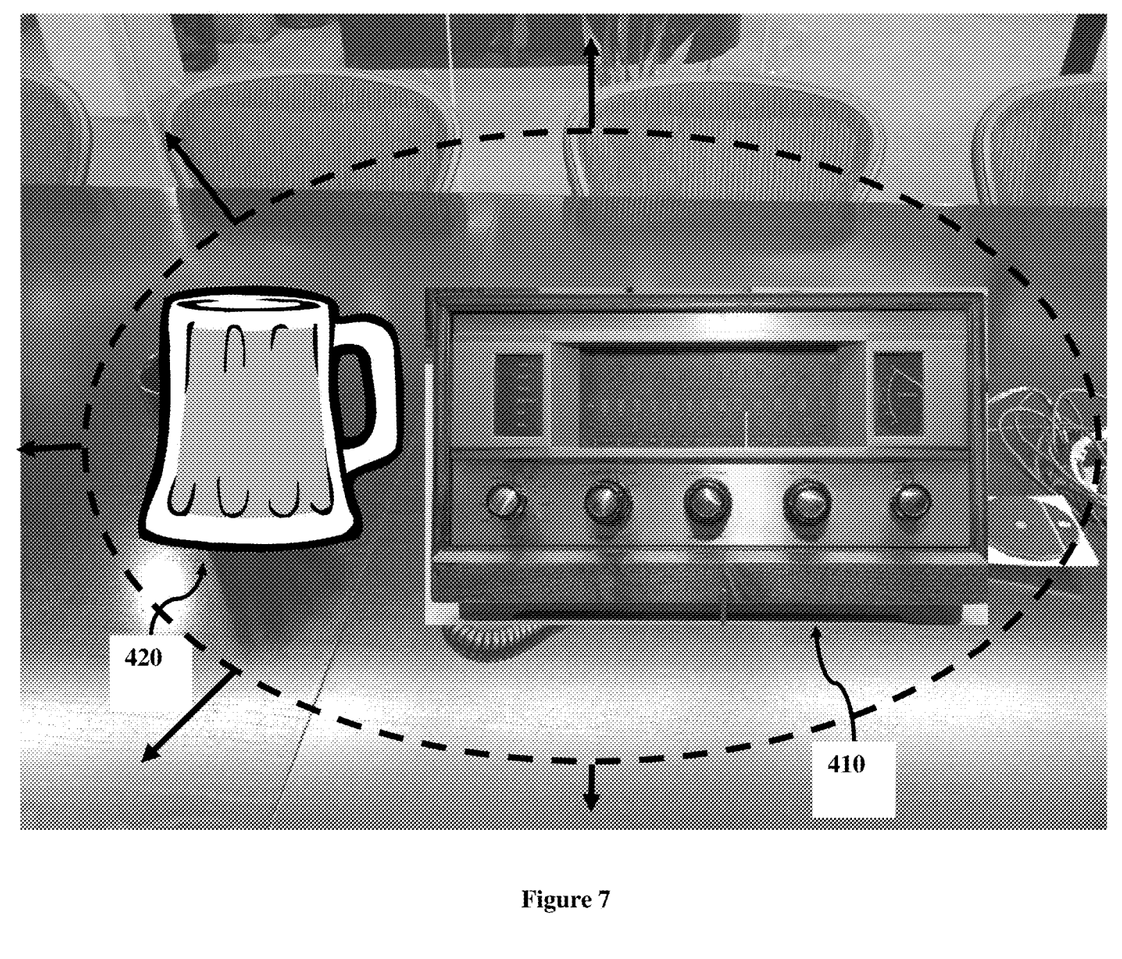
FIG. 7 provides an illustration of the multi-dimensional region of FIGS. 5-6, expanded to encompass both real-world objects in the scene, according to embodiments of the inventive subject matter.
Figure 8:
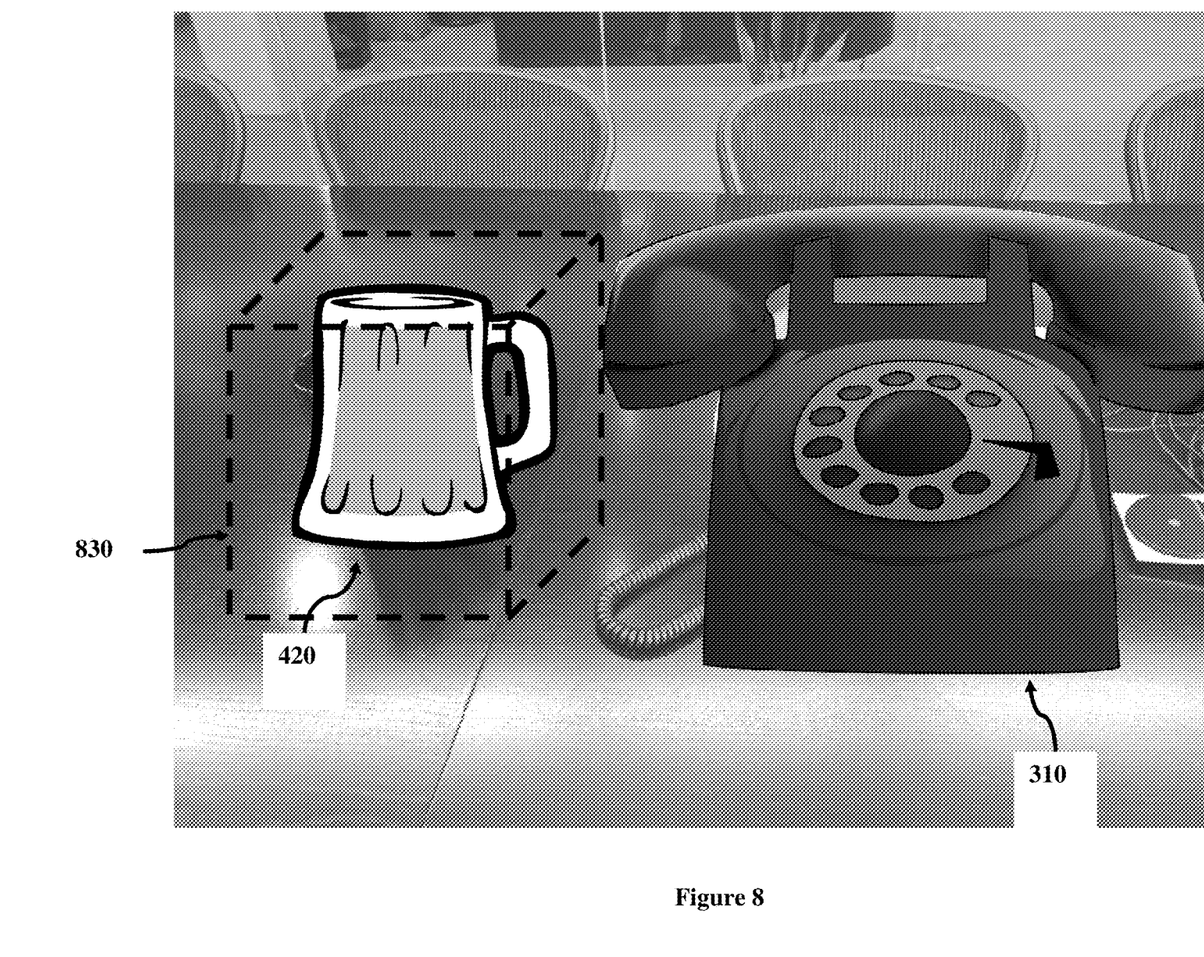
FIG. 8 provides an illustration of a three-dimensional multi-dimensional region, according to embodiments of the inventive subject matter.

In the example of the inventive subject matter of FIGS. 5-7, the multi-dimensional region 530 is depicted as a two-dimensional oval. However, it is contemplated that the multidimensional region could be a three-dimensional region, such as the region 830 of FIG. 8. In this embodiment, the three-dimensional region includes the real-world mug 220, and as such, the augmented reality asset 320 is replaced by second augmented reality asset 420. However, these embodiments allow for the multi-dimensional region 830 to be limited by depth "into" the image. As such, any real-world objects that are behind the real-world object 220 falling outside the multi-dimensional region 830 would not be subject to having their augmented reality assets changed to those of the second augmented reality environment.

In order to foster a greater community, a streamer broadcasting aspects of their lives might want to invite their community to interact with the streamer's real-life environment. This interaction could help the streamer's fans to feel closer to the streamer. In embodiments, the systems and methods of the inventive subject matter enable this interaction by enabling the users to, through the augmented reality environment, interact with real-world objects depicted in the streamer's video stream.

In these embodiments, the functions associated with a particular augmented reality assets can include instructions to interact with a real-world object within the scene by sending a command to the real-world device. In these embodiments, it is contemplated that the corresponding real-world device being interacted with is an internet-connected device capable of receiving commands (e.g., via wired or wireless communication interfaces such as ethernet, Wi-Fi, cellular, Bluetooth, etc.).

The interaction can be a direct interaction with the object such that the real-world object behaves in response to a user interaction with the augmented reality asset overlaid with the object. The interaction can also be a command such that an interaction with the augmented reality object is a command that is used to command a corresponding function of the real-world object.

For example, in the telephone augmented reality asset show in FIG. 3, a function to dial the telephone could place a call to the streamer's real-life telephone.

In certain instances, such as the example of FIG. 3, the augmented reality asset is of the same type of object as the real-world objects, and thus the control functions available to control the augmented reality object translate directly to commands used to control the real-world object to which the augmented reality object is overlaid. In an example of a command, an interaction with the augmented reality telephone that causes it to ring will also send a command to the real-life telephone that causes the real-life telephone to similarly ring.

Another illustrative example could be an augmented reality asset of a light switch overlaid over a real-life internet-connected light switch in the streamer's environment, wherein a user's interaction with the augmented reality light switch sends a command to the real-life light switch, causing the lights in the streamer's environment to turn on/turn off/change brightness, etc.

In another example, the function of the augmented reality asset does not literally mirror a function of the real-world object over which it is overlaid. For example, an augmented reality asset of a radio such as the radio 410 of FIG. 4 for the second theme could correspond to the real-life telephone for the purposes of overlaying, but the function of the augmented reality radio 410 could instead be mapped to a real-life radio elsewhere in the environment (even an off-screen radio). This mapping would be performed a priori with the specific radio in the real-world environment. Thus, when the user of the second augmented reality environment selects a command to play music by interacting with the augmented reality radio 410, the command to play music is not relayed to the real-world telephone 210 but instead to the real-life radio that, in this example, is off-screen but in the environment. In these embodiments, the real-life objects that users would be able to manipulate could depend on the theme they selected. For example, a user of the first augmented reality environment of FIG. 3 would be able to make a call via the real-life telephone 210 by interacting with the augmented reality telephone 310. However, the second user of the second augmented reality environment of FIG. 4 would not have this ability to do so because they do not have the telephone augmented reality asset as part of their theme. Conversely, the second user of the second augmented reality asset would be able to manipulate the real-life radio, which the first user cannot because the theme of FIG. 3 does not have a radio augmented reality asset. If the first user wanted to interact with the radio features, they would have to "wormhole" via the two-dimensional region such that the real-world telephone is included within the region, so that the first augmented reality asset of the telephone 310 (and its interactive features) is replaced with the second augmented reality asset of the radio 410 (and its respective interactive features).

In embodiments, the server 130 is programmed to recognize the presence of a person within the scene and adjust the presentation of one or more of the augmented reality assets based on the presence of the person within the scene.

This adjustment can include changing how the augmented reality asset is presented based on the person's presence "in front of" where the augmented reality asset is placed within the scene such that the augmented reality asset is properly occluded by the person's presence.

Further, the presentation of the augmented reality asset can be adjusted based on the person's actual interaction with the real-world object over which the augmented reality asset is superimposed. For example, if a person within the scene picks up the receiver of the telephone 210 in the real-world scene of FIG. 2, the server 130 adjusts the presentation of the telephone augmented reality asset 310 such that the person appears to pick up the receiver of the augmented reality telephone 310 by tracking the person's hand and appropriately displaying the receiver of the augmented reality telephone 310 such that the person's hand appears to be properly holding the receiver of the augmented reality telephone 310.

In situations where the augmented reality asset presented is not the same type of object as the real-world object over which it is superimposed (such as radio 410 of FIG. 4), the server 130 can be programmed to adjust the presentation of the augmented reality object to react to the person's interaction with the real-world object in other ways. For example, in response to the person picking up the receiver of the real-world telephone 210, the server 130 causes the radio 410 to appears as if it was turned on. Also, in embodiments, the server 130 can retrieve an additional augmented reality asset from the corresponding theme to superimpose over the real-world receiver such that the entirety of the real-world telephone 210 remains hidden by augmented reality assets.

As discussed above, the augmented reality environments generated by the server 130 are organized and generated according to various themes. In embodiments, the different possible augmented reality environments can be organized into subthemes that fit into the various themes. In these embodiments, the subthemes can be more specific situations, aspects or instances of the broader themes.

Examples of subthemes within the larger themes can include a beach subtheme, a skiing subtheme, and/or a Grand Canyon subtheme within a broader vacation theme. In certain embodiments, subthemes within a same theme can share certain augmented reality assets such that the subthemes are different but certain assets do not have to be duplicated within the database. For example, an office theme could have a law office subtheme, an accountant subtheme, and a mortgage banker subtheme, all of which could use the same augmented reality asset for a telephone or a computer.

As discussed above, in some embodiments the theme can be user selected. In other embodiments, the server 130 is programmed to select the theme for a user. In these embodiments, the server 130 is programmed to select themes for users based on factors such as a user location, a video image source location (the location of the scene depicted in the image captured by the camera), a time, a date, a season, and a weather condition. For example, if a theme is to be selected in December, the server 130 can select a theme that includes holiday-related augmented reality assets.

In the embodiments discussed thus far, the server 130 is programmed to analyze an image depicting a scene to recognize real-world objects within the image and apply augmented reality assets to those real-world objects. In further embodiments of the inventive subject matter, the server 130 stores a digital three-dimensional model of the entire scene depicted in the image data. This enables the server 130 to generate an avatar for the user, which the user can use within the scene depicted in the image.

To insert the avatar into the scene, the server 130 applies the digital three-dimensional model to the scene, matching it to the real-world scene. The avatar is then inserted into the digital three-dimensional model. The three-dimensional model is invisible to the user, so the user only sees the real-world scene, the avatar and any augmented reality assets that are part of the augmented reality environment. Because the perspective of three-dimensional model matches the perspective of actual real-world scene, the avatar's movements and interactions within the digital three-dimensional model appear to the user to properly match the real-world scene. As such, the avatar appears to move within the real-world scene seamlessly. The user avatar is capable of interacting with augmented reality assets presented within the mixed reality environment.

As noted above, in certain embodiments the augmented reality assets can control or otherwise interact with the real-world object in the scene. As such, in these embodiments, the avatar could appear to then interact with real-world object and cause real-world functions of these real-world objects to be executed. For example, for a streamer's audience, an audience avatar could then appear to be interacting with the streamer's real-world environment.

In embodiments, the avatar of the user is presented according to the theme of the augmented reality environment being generated. For example, if the theme of the augmented reality environment is a western theme, then the avatar could be presented wearing cowboy clothes.

In embodiments of the inventive subject matter, the server 130 can modify the appearance of a user avatar based on the presence of a multi-dimensional region such as the one of FIGS. 5-7. In the example of FIGS. 5-7, if the avatar of the first user was outside of the multi-dimensional region the avatar would appear according to the first theme of the first augmented reality environment (e.g., the office setting) whereas if the avatar of the first user moves such that it was within the multi-dimensional region, the server 130 then modifies the appearance of the first user's avatar according to the second theme, of the second augmented reality environment.

In variations of these embodiments, the display of additional avatars corresponding to other players can be determined on whether the avatars are within the multi-dimensional region in a given user's display. The following is an example illustrating these embodiments.

As discussed above, the screen of FIG. 4 is an illustrative example of a second augmented reality environment that would be presented to and viewed by a second user 151 on computing device 150. Likewise, FIGS. 5-6 show, from the perspective of the first user 141, "wormholing" into the second user's augmented reality environment by means of the multi-dimensional region 530—from the perspective of the first user 141, the area within the multi-dimensional region 530 is actually "looking into" the second augmented reality environment and as such any augmented reality assets presented within the multi-dimensional region 530 would correspond to the second augmented reality environment.

With that in mind, suppose a second user 151 has an avatar displayed in the second augmented reality environment, such as within the environment shown in FIG. 4. Prior to any wormholing, the first user 141 does not see the second user's avatar because all the first user 141 would see is the first augmented reality environment of FIG. 3. However, as the first user 141 begins wormholing as seen in FIGS. 5-7, the second user's avatar will not appear visible to the first user unless the second user's avatar moves into the area of the real-world environment on the screen that is within the multi-dimensional region 530.

It should be apparent to those skilled in the art that many more modifications besides those already described are possible without departing from the inventive concepts herein. The inventive subject matter, therefore, is not to be restricted except in the spirit of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Where the specification claims refer to at least one of something selected from the group consisting of A, B, C . . . and N, the text should be interpreted as requiring only one element from the group, not A plus N, or B plus N, etc.

What is claimed is:

1. A system, comprising:
a computer programmed to:
  receive, from at least one camera, an image of a physical space;
  overlay a first augmented reality asset over a depiction of a first real-world object in the image and a second augmented reality asset over a depiction of a second real-world object in the image, wherein the first augmented reality asset and the second augmented reality asset belong to a first set of augmented reality assets grouped according to a first theme, and wherein at least one functional element of the first real-world object is tied to at least one functional element of the first augmented reality asset;
  display the image of the physical space and the overlaid first augmented reality asset and second augmented reality asset as at least part of a first augmented reality environment;
  receive a selection of a multi-dimensional region within the image, the multi-dimensional region including the depiction of the second real-world object but not the depiction of the first real-world object;
  overlay a third augmented reality asset over the depiction of the second real-world object in the image, wherein the third augmented reality asset belongs to a second set of augmented reality assets grouped according to a second theme;
  display the overlaid third augmented reality asset as at least a part of a second augmented reality environment, wherein the first augmented reality asset according to the first theme remains visible simultaneous with the third augmented reality asset according to the second theme;
  receive a command from an activation of the at least one functional element of the first augmented reality asset, wherein the first augmented reality asset includes an associated first interactive function comprising a control over a real-world function of the real-world object; and
  execute, by the real-world object, the command associated with the at least one functional element of the real-world object.

2. The system of claim 1, wherein the computer is further programmed to:
  extend the multi-dimensional region to encompass an entire display area; and
  replace the first augmented reality asset with a fourth augmented reality asset from the second set of augmented reality assets.

3. The system of claim 1, wherein the first augmented reality environment corresponds to a first user and the second augmented reality environment corresponds to a second user.

4. The system of claim 1, wherein the first augmented reality asset includes an associated first interactive function according to the first theme and the second augmented reality asset includes an associated second interactive function according to the second theme.

5. The system of claim 1, further comprising:
  wherein the image of the physical space includes a depiction of a person; and
  wherein the computer is further programmed to:
    recognize a presence of a person within the physical space based on the depiction of the person; and
    obtain the first augmented reality asset and the second augmented reality asset based on the recognition.

6. The system of claim 1, wherein the first and second themes are selected from a plurality of subthemes.

7. The system of claim 1, wherein at least one of the first theme or second theme are selected based at least in part on a location, a time, a date, a season, and a weather condition.

8. The system of claim 1, wherein the computer is further programmed to:
  obtain a three-dimensional virtual model of the physical space;
  position a virtual avatar of a user within the image of the physical space based on the received image and the three-dimensional virtual model; and
  display the virtual avatar according to the first theme if the avatar is outside of the multi-dimensional region and according to the second theme if the avatar is within the multi-dimensional region.

* * * * *